US008686643B2

(12) United States Patent
Taubert et al.

(10) Patent No.: US 8,686,643 B2
(45) Date of Patent: Apr. 1, 2014

(54) SYSTEM AND METHOD FOR REDUCING LAMP RESTRIKE TIME

(75) Inventors: Timothy A. Taubert, Kirtland, OH (US); Amir P. Fallahi, W. Bloomfield, MI (US); Raymond Christian Rice, II, New Philadelphia, OH (US)

(73) Assignee: ABL IP Holding LLC, Conyers, GA (US)

( * ) Notice: Subject to any disclaimer, the term of this patent is extended or adjusted under 35 U.S.C. 154(b) by 669 days.

(21) Appl. No.: 12/917,959

(22) Filed: Nov. 2, 2010

(65) Prior Publication Data

US 2012/0104951 A1    May 3, 2012

(51) Int. Cl.
*H01J 61/52* (2006.01)

(52) U.S. Cl.
USPC .......................................................... 315/117

(58) Field of Classification Search
USPC ......... 315/112, 114, 115, 116, 117, 118, 307, 315/308, 309, DIG. 2, DIG. 5
See application file for complete search history.

(56) References Cited

U.S. PATENT DOCUMENTS

| | | | | |
|---|---|---|---|---|
| 6,095,671 A | * | 8/2000 | Hutain | 362/373 |
| 6,111,359 A | * | 8/2000 | Work et al. | 315/56 |
| 6,621,239 B1 | * | 9/2003 | Belliveau | 315/312 |
| 2005/0184632 A1 | * | 8/2005 | Galvez et al. | 313/113 |
| 2006/0227561 A1 | * | 10/2006 | Childers et al. | 362/373 |
| 2008/0018257 A1 | * | 1/2008 | Beasley | 315/112 |
| 2010/0096993 A1 | * | 4/2010 | Ashdown et al. | 315/113 |

* cited by examiner

*Primary Examiner* — Minh D A
(74) *Attorney, Agent, or Firm* — Kilpatrick Townsend & Stockton, LLP

(57) ABSTRACT

Systems and methods for reducing lamp restrike time are provided. In a lighting apparatus having a housing, a reflector, and a lamp positioned so that at least a portion of the outer jacket of the lamp is within the reflector, a circulating device is operated when the lamp is off and a temperature inside the housing is above a predefined temperature. The circulating device circulates air around the outer jacket of the lamp to cool the lamp so the restrike time is reduced without the need for a starting device with a starting voltage high enough to restart the lamp when the lamp is hot.

20 Claims, 4 Drawing Sheets

SYSTEM AND METHOD FOR REDUCING LAMP RESTRIKE TIME

FIELD OF THE INVENTION

The present invention is related to lighting apparatuses, and more particularly to lighting apparatuses with lamps that operate at high temperatures.

BACKGROUND OF THE INVENTION

High intensity discharge ("HID") lamps, such as metal halide or electrodeless plasma discharge lamps, provide a high efficacy light source and are widely used in the lighting industry. When an HID lamp is cool, the pressure in the arc tube is low and has a relatively low resistance. To start the lamp a ballast or other starting device provides a starting voltage to the lamp that is high enough to start the lamp at this relatively low resistance. Once the lamp is on, its temperature increases so that when the lamp is operating at its normal operating temperature the pressure in the arc tube is high and requires a much higher starting voltage than when the lamp is cool. If the lamp goes off due to a power interruption, then when power is restored the ballast or other starting device attempts to restart or restrike the lamp. The restrike attempts begin when the lamp is close to its normal operating temperature, but the lamp will not restart because the starting voltage provided by the ballast is too low. As the lamp cools, the pressure in the arc tube drops and eventually the pressure drops enough that the lamp can be restarted. The time between the lamp turning off and the time to restart the lamp is called the restrike time and typically ranges from 15 to 45 minutes.

One method to reduce the restrike time is to use a ballast that can provide a voltage which is high enough to restrike the lamp at a higher pressure. These types of ballasts are expensive, have a relatively short lifespan, and are associated with safety issues.

Another method to reduce the restrike time is to use a full-time cooling system. One example of a full-time cooling system is a fan that circulates air between the lighting apparatus and the surrounding environment, such as that used in an indoor projection system. However, for some applications, such as industrial lighting fixtures and outdoor lighting fixtures, full-time cooling is not practical due to the expense of operating the cooling system, the risk that circulating air from the surrounding environment may introduce contaminants into the luminaire, or other reasons.

SUMMARY

In one system for reducing a lamp restrike time, a part-time active cooling system speeds the cooling of the lamp and reduces the restrike time. A lighting fixture or luminaire includes a housing and a reflector with a lamp positioned so that at least a portion of the outer jacket of the lamp is within the reflector. A thermal sensor senses the temperature at a point inside the housing, which in some instances is a point near the outer jacket of the lamp and a circulating device circulates air around the outer jacket of the lamp. A control device senses the operational state of the lamp, and based on the operational state of the lamp controls, at least in part, the operation of the circulating device. The circulating device operates when the control device determines that the lamp is off and the thermal sensor indicates that the temperature at a point inside the housing is above a predefined temperature. When the control device determines that the lamp is on or the thermal sensor indicates that the temperature at a point inside the housing is below the predefined temperature, then the circulating device is turned off.

The circulating device may be a fan, a synthetic jet, a heat pipe, a liquid cold plate, an air-to-air heat exchanger, or any other suitable device for circulating air. The lamp may be a lamp that has a high operating temperature, such as a high intensity discharge lamp.

Operating the circulating device only when the lamp is off and the temperature is above the threshold temperature, reduces the restrike time without requiring a ballast with a hot starting voltage (voltage high enough to start the lamp when it is hot). In addition, this approach is less expensive to implement than systems with a full-time cooling system and does not require the circulation of air from the surrounding environment.

Other features, advantages, and objects of the present invention will be apparent to those skilled in the art with reference to the remaining text and drawings of this application.

DETAILED DESCRIPTION

Aspects of the invention reduce the lamp restrike time using a part-time active cooling approach. A circulating device provides cooling by circulating air around the outer jacket of the lamp. The circulating device operates when the lamp is off and a temperature inside the housing is above a predefined temperature. When the lamp turns on or the temperature falls below the predefined temperature, the circulating device turns off.

Lighting Fixture

Figure 1:
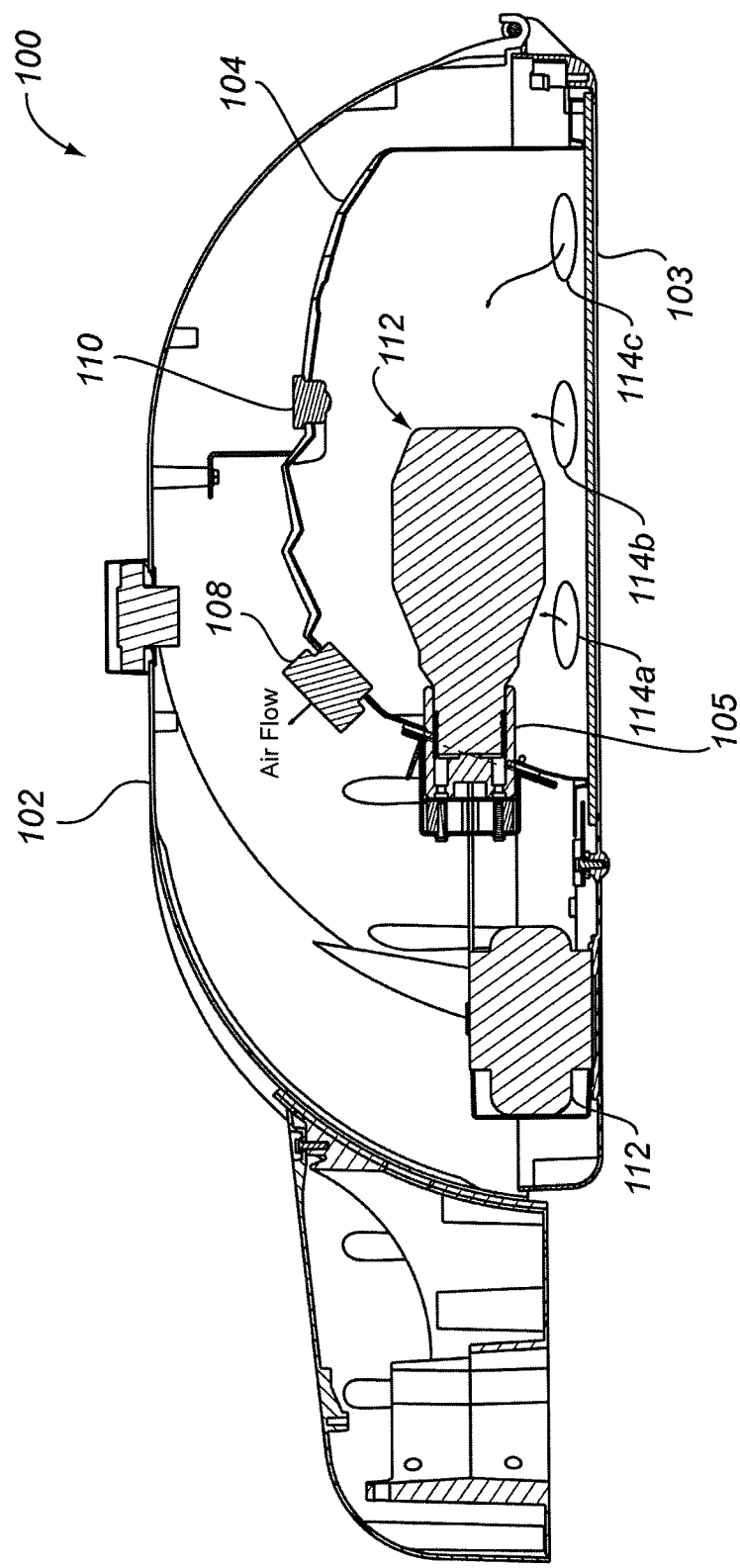
FIG. 1 is a cross section of an exemplary luminaire.

FIG. 1 illustrates a cross section of a luminaire 100 for one design that includes a luminaire housing 102, a reflector 104, a lamp 106 in a socket 105, a circulating device 108, a thermal sensor 110, a ballast or other starting device 112, and a control device (not shown). The circulating device circulates air around the outer jacket of the lamp. In the luminaire illustrated by FIG. 1, the circulating device circulates air between the area defined by the inner surface of the reflector and the area defined by the outer surface of the reflector and the inner surface of the luminaire housing. The reflector may include one or more openings 114a, 114b, 114c to facilitate the air flow. The placement, shape and size of the openings shown in FIG. 1 are exemplary and other alternatives will be apparent to those skilled in the art.

FIG. 1 illustrates a sealed luminaire with glass 103 covering the aperature. Since the air is circulated within the luminaire no contaminants are introducted into the luminaire from outside. In other systems, the luminaire may include an aperature without a covering or other openings in the housing (not shown) to allow the intake and discharge of outside air. The circulating device 108 may be a fan, a synthetic jet, a heat pipe, a liquid cold plate, an air-to-air heat exchanger, or any other suitable device. The placement of the circulating device shown in FIG. 1 is exemplary of a placement that has minimal optical impact on the light produced. Other placements are also possible and may be based, at least in part, on the available space within the housing.

The thermal sensor 110 shown in FIG. 1 is located inside the reflector so that it can sense the temperature at a point near the outer jacket of the lamp. The thermal sensor is located so that it has minimal optical impact on the light produced, but is close enough to the lamp to sense a temperature that is at or near the outer jacket of the lamp. In some systems the thermal sensor includes a switch that closes at a certain temperature and remains closed as long as the temperature is at or above that temperature. The switch opens once the temperature drops below that temperature. In other systems, the switch is separate from the sensor and is controlled by the control device.

In the luminaire illustrated in FIG. 1, the ballast 112 and the control device are located within the housing, but outside the reflector and the circulating device 108 is located at least partially within the reflector. In other luminaires, the circulating device may be located in other locations within the housing, but outside the reflector.

FIG. 1 illustrates that the temperature sensor monitors the temperature near the outer jacket of the lamp. Alternative designs may measure the temperature at other locations, including locations either inside or outside the reflector so long as the temperature at the monitored location changes in correlation to the temperature near the outside jacket of the lamp and the predefined temperature is selected accordingly.

Operation of an Exemplary Cooling System

Figure 2:
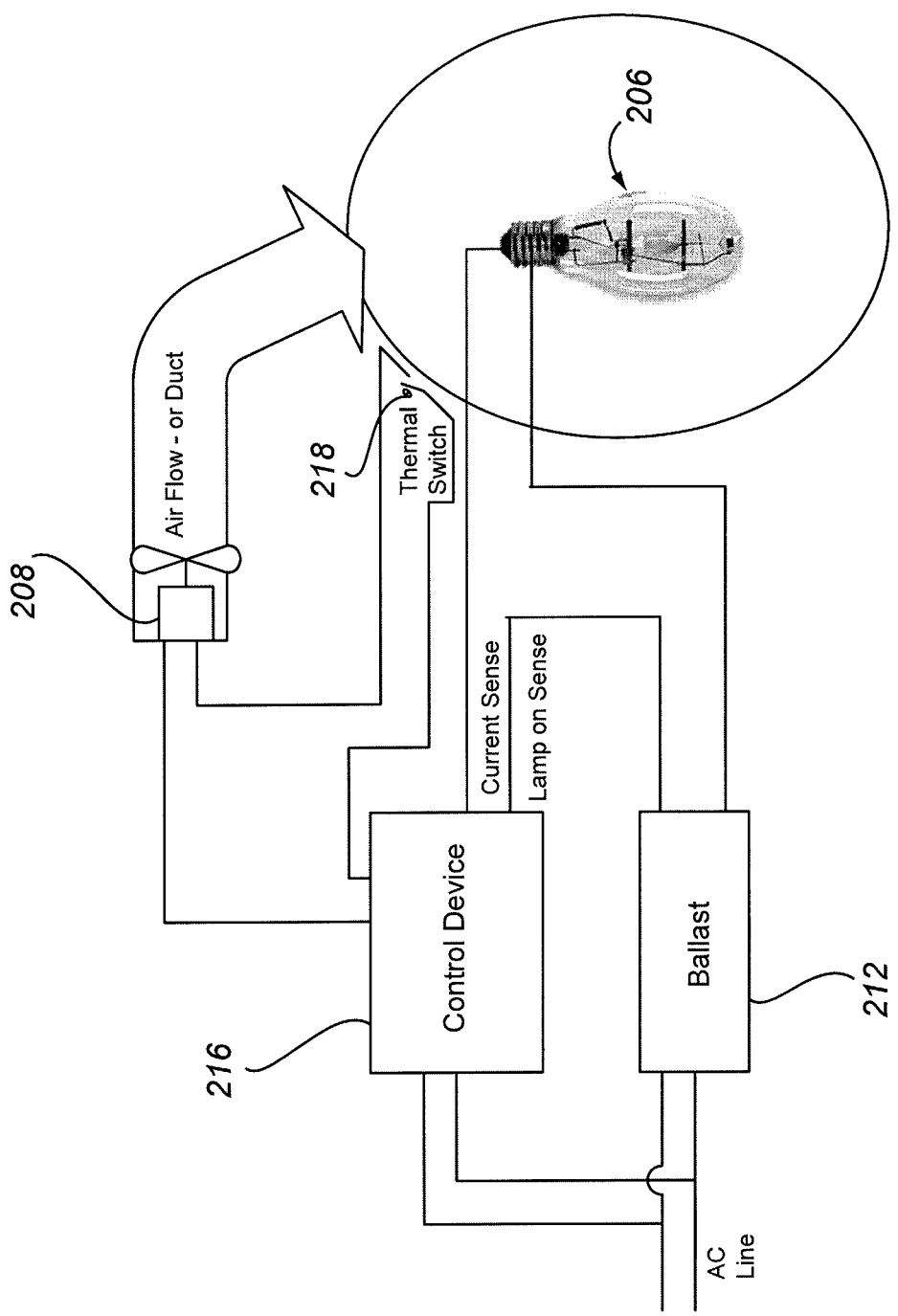
FIG. 2 is a block diagram illustrating an exemplary cooling system.

FIG. 2 is a block diagram illustrating the operation of an exemplary cooling system. The system includes a lamp 206, a ballast 212, a control device 216, a switch 218, and a circulating device 208. The switch 218 is a thermal switch that is controlled by a temperature sensor. Once the sensor detects that the temperature has reached a predefined temperature, the switch closes and remains closed until the temperature drops below the predefined temperature. Once it drops below the predefined temperature, the switch opens. In some systems, the temperature is set to correlate to approximately the temperature where the lamp can be restarted with a nominal ballast starting voltage (referred to herein as the restrike temperature). In other luminaires, the predefined temperature may be set so that it works with a range of environmental or operating conditions. For example, the predefined temperature may be set above the normal ambient temperature and some margin below the restrike temperature. In this example, the circulating device may stay on a bit longer than if the predefined temperature correlates more closely to the restrike temperature, but it allows the system to work with a wider range of environmental or operating conditions.

The control device 216 determines the operational state of the lamp by sensing the current from the ballast 212. When the control device senses a current value that corresponds to the on state of the lamp, then the control device disables the circulating device. When the control device senses a current value that corresponds to the off state of the lamp, then the control device enables the circulating device. If the switch is closed and the circulating device is enabled, then the circulating device operates. If either the switch opens or the control device disables the circulating device, then it stops. Thus, the circulating device turns on when the lamp is off and the temperature is above the predefined temperature and turns off once the lamp is on or the temperature is below the predefined temperature.

In some systems, the ballast 212 does not provide a hot starting voltage and operates in the same manner as in a system without a cooling system. If the ballast senses that the lamp is off and the luminaire is powered, it tries to start the lamp. It will continue to try to start the lamp until the lamp turns on. The addition of a part-time active cooling system cools the lamp and shortens the restrike time without requiring a ballast with a hot starting voltage.

Cooling Curves Illustrating Reduced Restrike Time

Figure 3:
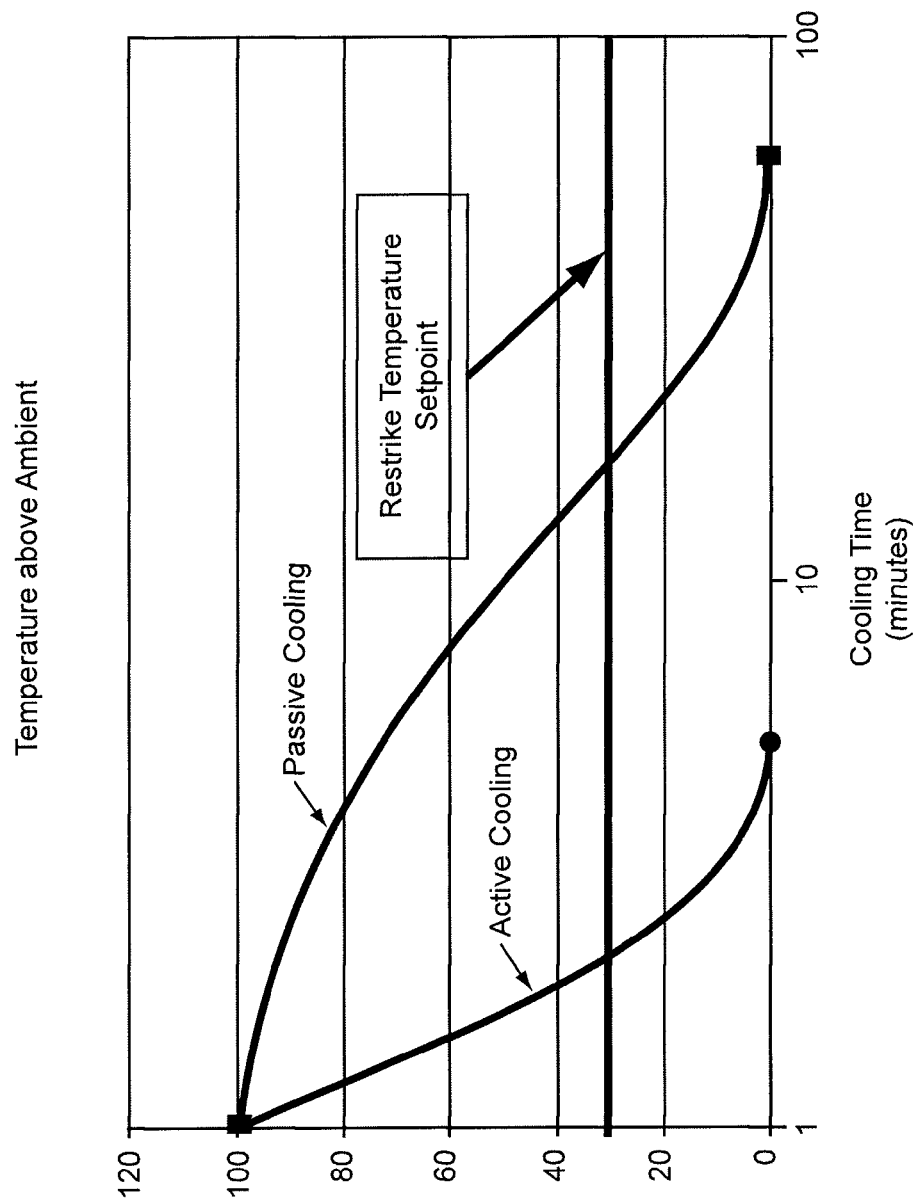
FIG. 3 is a graph comparing the cooling rate for an exemplary system with passive cooling and an exemplary system with part-time active cooling.

FIG. 3 is a graph that illustrates the reduction in restrike time that is achieved with a part-time active cooling system. The x-axis corresponds to time in minutes and the y-axis corresponds to the temperature above ambient at or near the outer jacket of the lamp. The curve labeled Passive Cooling illustrates how the temperature at or near of the outer jacket of the lamp decreases over time once the lamp is turned off when there is no active cooling, i.e., no circulating device. The curve labeled Active Cooling illustrates how the temperature at or near of the outer jacket of the lamp decreases over time once the lamp is turned off when there is part-time active cooling, i.e., a circulating device operates when the lamp is off and the temperature is above a predefined temperature. The horizontal line labeled Restrike Temperature Setpoint corresponds to the restrike temperature for the lamp using a nominal starting voltage. A comparison of the Passive Cooling curve and the Active Cooling curve shows that the Active Cooling curve crosses the Restrike Temperature Setpoint much more quickly than the Passive Cooling curve indicating that the restrike time for a luminaire with part-time active cooling is significantly less than a luminaire without a cooling system.

The cooling curves for different combinations and designs of luminaire housings, luminaire reflectors, lamps and cooling systems will differ. One way to determine the restrike temperature for a particular combination is to observe the operation of the particular combination of luminaire housing, luminaire reflector, lamp and ballast after a power interruption. This observation can be part of the design or assembly process. The temperature when the lamp is restarted using a nominal voltage corresponds to the Restrike Temperature Setpoint and can be used as the predefined threshold or temperature.

Operation of Another Exemplary Cooling System

Figure 4:
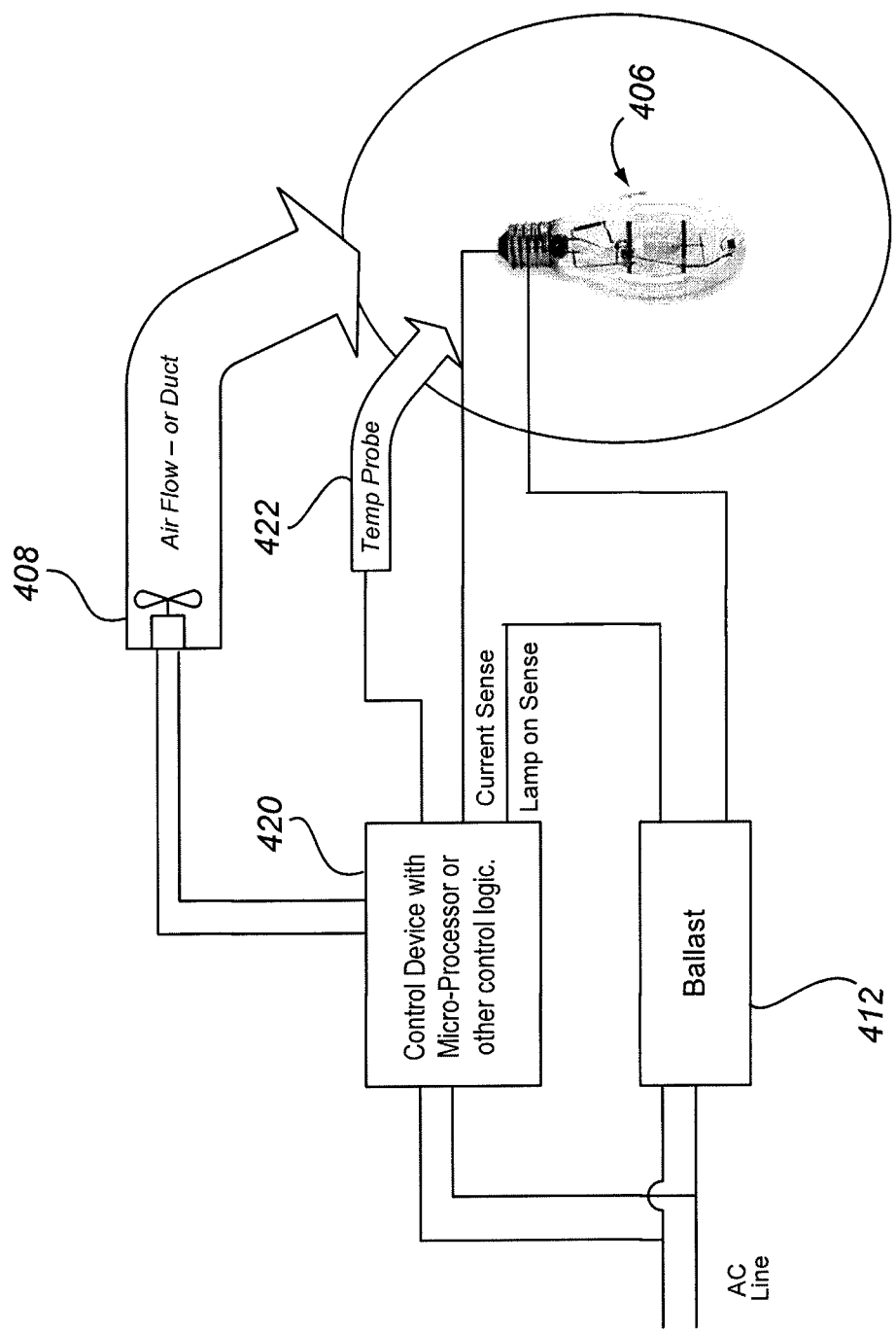
FIG. 4 is a block diagram illustrating an exemplary cooling system.

FIG. 4 illustrates an exemplary system that uses a control device 420 that includes a microprocessor or other suitable type of controller, to control the circulating device. The system includes a lamp 406, a ballast 412, a temperature sensor or probe 422, a control device 420, and a circulating device 408. The temperature sensor 422 measures the temperature near the outer jacket of the lamp or at another point inside the housing and provides the temperature information to the control device 420.

The control device 420 monitors the current from the ballast 412 to determine when the lamp 406 is on. The control device 420 controls the operation of the circulating device 408 so that the circulating device is on when the temperature is above a predefined temperature and the lamp is off. If the lamp is on or the temperature is below the predefined temperature, then the control device turns the circulating device off.

If the control device 420 includes a microprocessor or other suitable type of controller, then the system can implement an automatic calibration routine to determine the predefined temperature. In one system, the control device can determine the type of lamp installed by measuring the lamp current and in some instances the lamp voltage. If the system is designed to work with lamps that have the same or approximately the same voltage, then the control device 420 measures the lamp current and determines the lamp wattage. If the system is designed to work with lamps that have different voltages, then the control device 420 measures the lamp current and the lamp voltage and using the measured values determines the lamp wattage. The control device 420 can use a look-up table to determine the predefined temperature based on the lamp wattage and then use the predefined temperature and the operating current to control the circulating device 408.

If the control device knows the lamp current, the control device can alternatively determine the predefined temperature by: 1) turning the lamp on, 2) allowing the lamp to stay on for a sufficient amount of time for the entire luminaire to reach its steady state operating temperature, 3) turning the lamp off, 4) turning the circulating device on, and 4) allowing the ballast to try to restart the lamp. In some systems, the circulating device is not turned on while the control device determines the predefined temperature. When the control device senses the current needed to operate the lamp, the control device determines that the lamp is on and reads the temperature from the temperature probe. This temperature represents the predefined temperature. Once the control device determines the predefined temperature, it can use the predefined temperature in conjunction with the operating current to control the circulating device, as described above. The automatic calibration routines can be executed during assembly or after installation.

The foregoing is provided for purposes of illustrating, describing, and explaining embodiments of the present invention and is not intended to be exhaustive or to limit the invention to the precise forms disclosed. Further modifications and adaptation to these embodiments will be apparent to those skilled in the art and may be made without departing from the scope and spirit of the invention. For example, the predefined temperature may correspond to the restrike temperature or may be another temperature that is determined to be low enough that once reached the circulating device can be turned off. In addition, the location of the circulating device, temperature sensor, and openings in the reflector may vary from the exemplary locations shown in the figures. The locations of these may depend in part on the design and dimensions of the luminaire and the respective components.

We claim:

1. A lighting fixture comprising:
   a lamp positioned so that at least a portion of an outer jacket of the lamp is within a reflector;
   the reflector;
   a thermal sensor inside the reflector for sensing a temperature near the outer jacket of the lamp;
   a circulating device for circulating air around the outer jacket of the lamp;
   a control device for sensing an operational state of the lamp and for controlling a circulating device based on the operational state of the lamp, wherein the control device controls the circulating device so that the circulating device is on when the control device determines that the lamp is off and the thermal sensor indicates that the temperature near the outer jacket of the lamp is above a predefined temperature and the control device controls the circulating device so that the circulating device is off when the control device determines that the lamp is on, and wherein the circulating device is off when the thermal sensor indicates that the temperature near the outer jacket of the lamp is below the predefined temperature; and
   a housing, wherein the lamp, the reflector, the control device, the thermal sensor and the circulating device are positioned inside the housing.

2. The lighting fixture of claim 1, wherein the circulating device circulates air between an area defined by an inner surface of the reflector and an area defined between an outer surface of the reflector and an inner surface of the housing.

3. The lighting fixture of claim 1, further comprising a ballast, wherein the control device senses the operational state of the lamp by sensing current from the ballast.

4. The lighting fixture of claim 3, wherein the circulating device, the ballast, and the control device are located between the reflector and the housing.

5. The lighting fixture of claim 3, wherein the control device determines the predefined temperature by:
   turning the lamp on;
   allowing the lamp to stay on for a time sufficient for the lighting fixture to reach a steady state operating temperature;
   turning the lamp off;
   allowing the ballast to attempt to restrike the lamp using a nominal starting voltage;
   monitoring the temperature near the outer jacket of the lamp;
   monitoring the current from the ballast to determine when the lamp turns on; and
   determining that the temperature near the outer jacket of the lamp is the predefined temperature when the current indicates that the lamp is on.

6. The lighting fixture of claim 3, wherein the control device determines the predefined temperature by:
   turning the lamp on;
   determining the current from the ballast when the lamp is on;
   using the current to determine a lamp wattage; and
   using the lamp wattage to determine the predefined temperature.

7. The lighting fixture of claim 1, wherein the thermal sensor includes a switch that closes at approximately the predefined temperature.

8. The lighting fixture of claim 1, wherein the circulating device is one of the following: a fan, a synthetic jet, a heat pipe, a liquid cold plate, or an air-to-air heat exchanger.

9. The lighting fixture of claim 1, wherein the reflector includes a plurality of openings to allow air to circulate between an area defined by an inner surface of the reflector and an area defined between an outer surface of the reflector and an inner surface of the housing.

10. A method for cooling a lamp, comprising:
    sensing a temperature at a point inside a housing of a lighting fixture that includes the lamp;
    sensing an operational status of the lamp;
    using a control device to control a circulating device so that the control device to enables operation of the circulating device when the lamp is off and to disables operation of the circulating device when the lamp is on;
    if the temperature at the point inside the housing is above a predefined temperature and the control device determines that the lamp is off, then operating the circulating device to circulate air around an outer jacket of the lamp; and
    if the temperature at the point inside the housing is below the predefined temperature and the control device determines that the lamp is off, then disabling operation of the circulating device; and
    if the control device determines that the lamp is on, then disabling operation of the circulating device.

11. The method of claim 10, wherein operating a circulating device to circulate air around the outer jacket of the lamp comprises circulating air between an area defined by an inner surface of a reflector and an area defined between an outer surface of the reflector and an inner surface of the housing.

12. The method of claim 10, further comprising:
determining the predefined temperature by:
turning the lamp on;
allowing the lamp to stay on for a time sufficient for the lighting fixture to reach a steady state operating temperature;
turning the lamp off;
attempting to restrike the lamp using a nominal starting voltage;
monitoring the temperature at the point inside the housing;
monitoring lamp current to determine when the lamp turns on;
determining that the temperature at the point inside the housing is the predefined temperature when the lamp current indicates that the lamp is on.

13. The method of claim 10, further comprising:
determining the predefined temperature by:
turning the lamp on;
determining a current for the lamp while the lamp is on;
using the current for the lamp to determine a lamp wattage; and
using the lamp wattage to determine the predefined temperature.

14. The method of claim 13, wherein determining the predefined temperature further comprises:
determining a voltage for the lamp while the lamp is on; and
wherein using the current for the lamp to determine a lamp wattage comprises using the current for the lamp and the voltage for the lamp to determine the lamp wattage.

15. The method of claim 10, wherein sensing an operational state of the lamp comprises sensing a current from a ballast.

16. A lighting fixture comprising:
a socket for receiving a lamp;
a reflector;
a thermal sensor for sensing a temperature at a point inside a housing;
a circulating device for circulating air around an outer jacket of the lamp;
a control device for sensing an operational state of the lamp and for controlling the circulating device based on the operational state of the lamp, wherein the control device controls the circulating device so that the circulating device is on when the control device senses that the lamp is off and the thermal sensor indicates that the temperature at the point inside the housing is above a predefined temperature and the control device controls the circulating device so that the circulating device is off when the control device senses that the lamp is on, and wherein the circulating device is off when the thermal sensor indicates that the temperature at the point inside the housing is below the predefined temperature;
a ballast that provides a nominal starting voltage; and
the housing, wherein the socket, the reflector, the control device, the thermal sensor, the ballast, and the cooling system are positioned inside the housing.

17. The lighting fixture of claim 16, wherein the circulating device circulates air between an area defined by an inner surface of the reflector and an area defined between an outer surface of the reflector and an inner surface of the housing.

18. The lighting fixture of claim 16, wherein the control device determines the predefined temperature by:
turning the lamp on;
allowing the lamp to stay on for a time sufficient for the lighting fixture to reach a steady state operating temperature;
turning the lamp off;
allowing the ballast to attempt to restrike the lamp using the nominal starting voltage;
monitoring the temperature at the point inside the housing;
monitoring lamp current to determine when the lamp turns on; and
determining that the temperature at the point inside the housing is the predefined temperature when the lamp current indicates that the lamp is on.

19. The lighting fixture of claim 16, wherein the control device determines the predefined temperature by:
turning the lamp on;
determining a current for the lamp while the lamp is on;
using the current for the lamp to determine a lamp wattage; and
using the lamp wattage to determine the predefined temperature.

20. The lighting fixture of claim 16, wherein the circulating device is one of the following: a fan, a synthetic jet, a heat pipe, a liquid cold plate, or an air-to-air heat exchanger.

* * * * *